(12) United States Patent
Fukuo et al.

(10) Patent No.: US 7,384,459 B2
(45) Date of Patent: Jun. 10, 2008

(54) CRAYON

(75) Inventors: Hidetoshi Fukuo, Osaka (JP); Hirokazu Matsuda, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 230 days.

(21) Appl. No.: 11/182,799

(22) Filed: Jul. 18, 2005

(65) Prior Publication Data

US 2006/0062906 A1 Mar. 23, 2006

(30) Foreign Application Priority Data

Jul. 20, 2004 (JP) ............................. 2004-211994

(51) Int. Cl.
*C09D 13/00* (2006.01)
(52) U.S. Cl. .................................................. 106/31.07
(58) Field of Classification Search .............. 106/31.07
See application file for complete search history.

(56) References Cited

U.S. PATENT DOCUMENTS 5,084,098 A * 1/1992 Olson ...................... 106/31.09
6,203,910 B1 * 3/2001 Fukuo et al. ................ 428/413
6,602,332 B2 * 8/2003 Seki ......................... 106/31.07
2001/0029275 A1 * 10/2001 Shirota et al. .............. 524/366
2003/0029354 A1 * 2/2003 Seki ......................... 106/31.07

FOREIGN PATENT DOCUMENTS

JP 58134166 A * 8/1983

OTHER PUBLICATIONS

English Abstract Translation of JP 58-134166.*

* cited by examiner

*Primary Examiner*—J. A. Lorengo
*Assistant Examiner*—Veronica Faison-Gee
(74) *Attorney, Agent, or Firm*—Wenderoth, Lind & Ponack, L.L.P.

(57) ABSTRACT

The invention provides a crayon comprising an organic solvent, a resin soluble in the organic solvent, a coloring agent, a gelling agent and an interferential pearl luster pigment. The crayon provides a metallic or pearly coating film, and has characteristics such that the color tone of the coating film varies with an angle for viewing the coating film, namely, a visual angle for the coating film. Therefore, for example, when applied to a flaw caused in metallic or pearly coating of automobiles, the crayon is adapted to such coating of automobiles to form an integrated coating film, so that it is suitably used for repairing such a flaw.

7 Claims, No Drawings

CRAYON

TECHNICAL FIELD

The present invention relates to a crayon which provides a metallic or pearly coating film, and in addition, which has such characteristics that the color tone of the coating film varies with an angle for viewing the coating film, namely, a visual angle for the coating film. In particular, the invention relates to a crayon which provides a metallic or pearly coating film that is superior in brightening, adhesion and drawing properties, as well as changeable in color tone. Accordingly, the crayon of the invention can suitably be used not merely for drawing but also for applying to a flaw of metallic or pearly coating of automobiles to repair the flaw. The invention further relates to a method of repairing such coating with the crayon as mentioned above.

BACKGROUND ART

Conventionally, in order to form a coating film or drawing traces having reflective metallic luster such as gold color or silver color, a crayon containing semi-evaporated glass beads is described in Japanese Unexamined Patent Publication No. 58-134167. A further crayon containing metal flakes (lame) is described in Japanese Unexamined Patent Publication No. 59-93770. These crayons provide a coating film having metallic luster and reflecting properties only to some extent. That is, the coating film is not sufficient in metallic luster and reflecting properties, and in addition, it is lacking in so-called depth. Further, the crayons are not adapted to metallic or pearly coating, so that even though applied to a flaw of such coating, the crayons have little performance for repairing the flaw.

Under these circumstances, paints or solid drawing materials providing a metallic or pearly coating film are also proposed. For example, a paint to be applied to a scratch caused on a surface of metallic enameled products such as covering materials to repair the scratch is described in Japanese Unexamined Patent Publication No. 5-279604. The paint comprises a combination of a clear resin paint and the same resin-based pigmented paint blended with an aluminum paste and a pearl luster pigment. The pigment is a solid-liquid mixture and it has a defect that a pigment having higher specific gravity settles down with time to lose uniformity. In addition, the paint is poor in immediate effectiveness and convenience for the reason that drying requires time after being applied to a scratch on a surface of enameled products.

A solid drawing material providing a coating film having luster in metallic color or pearly color, as well as color tone which varies with an angle for viewing, is described in Japanese Unexamined Patent Publication No. 2003-221552. The solid drawing material is comprised of wax as a fixing agent and a pearl luster pigment dispersed therein. However, the solid drawing material using wax as a fixing agent is not sufficient in fixity of a coating film on a drawing surface such as of a metal plate or a resin board, particularly, in sticking tendency of pigment onto a coating film and resistance of a coating film to high environmental temperature. For example, a body of automobiles is exposed to sunlight and frequently warmed to high temperature, so that such a solid drawing material can not be used for repairing a flaw of coating of a body of automobiles for the reason that even though applied to the flaw to form a coating film thereon, wax in the coating film formed on the flaw is softened and melted, and then the flaw is exposed again. Depending on the case, a further problem is that a coating film formed on the flaw is melted by wax itself for automobiles when a body of the automobile is waxed.

SUMMARY OF THE INVENTION

Therefore, it is an object of the invention to provide a crayon which forms a metallic or pearly coating film superior in brightening, adhesion and drawing properties, and in addition, having characteristics such that the color tone of the coating film varies with an angle for viewing the coating film, namely, a visual angle for the coating film.

It is a further object of the invention to provide a crayon for repairing a flaw of coating. The crayon can be applied to a flaw of coating where repairing is required to form a coating film thereon without melting and with no discomfort, unlike a conventional solid drawing material using wax as a fixing agent, while it is adapted to the coating, for example of a body of automobiles which is frequently warmed to high temperature. It is still a further object of the invention to provide a method of repairing such a flaw on a coating with the crayon.

The invention provides a crayon which comprises an organic solvent, a resin soluble in the organic solvent, a coloring agent, a gelling agent and an interferential pearl luster pigment. Further, the invention provides a method of repairing a flaw on a surface of a coating in metallic color or pearly color by applying the above-mentioned crayon to such a flaw.

DETAILED DESCRIPTION OF THE INVENTION

The crayon according to the invention has the same signification as the solid drawing material, contains an interferential pearl luster pigment as a coloring agent, and forms a coating film with luster having metallic or pearly iris on a drawing surface. The crayon according to the invention, therefore, can suitably be used for ordinary drawing and additionally, particularly, for repairing a flaw of metallic or pearly coating.

The crayon of the invention contains an organic solvent. The solvent usable is not particularly limited and includes, for example, aromatic hydrocarbons such as xylene and tetralin, cyclohexane-based hydrocarbons having nine or ten carbon atoms such as n-propylcyclohexane and n-butylcyclohexane, ketones such as methyl isobutyl ketone, esters such as butyl acetate and butyl propionate, alcohols, glycols, glycol ethers and glycol ether esters, and among them, an organic solvent of at least one selected from the group consisting of glycols, glycol ethers, glycol ether esters and alcohols is preferably used. Specific examples of such a preferable organic solvent include methanol, ethanol, isopropyl alcohol, 3-methyl-3-methoxybutanol and 3-methoxy-1-butanol as alcohols, ethylene glycol, propylene glycol, diethylene glycol and dipropylene glycol as glycols, methyl ether, ethyl ether, propyl ether, butyl ether and phenyl ether of the above-mentioned glycols as glycol ethers, and acetate of the above-mentioned glycol ethers as glycol ether esters.

Among these, in particular, at least one selected from the group consisting of ethylene glycol monobutyl ether, propylene glycol monomethyl ether, propylene glycol monopropyl ether, propylene glycol monobutyl ether, dipropylene glycol monomethyl ether and 3-methyl-3-methoxybutanol is preferably used.

The amount of organic solvent used is properly determined in relation with other components such as a coloring agent, and it is usually in a range of about 20 to 80% by weight, preferably about 35 to 65% by weight. The use of excessive amount of the organic solvent brings a possibility that it is difficult to gelate all the components together. Meanwhile, the use of too little organic solvent brings a possibility that it is difficult to dissolve all the components therein to form a uniform gel. In such a case, the drawing formed with the crayon obtained contains unevenness in a coating film to bring a possibility that a metallic or pearly effect is decreased.

A pearl luster pigment, as well known, is usually a pigment comprising a base material such as natural mica or synthetic mica of which surface is covered with titanium dioxide, and has silver-white pearl luster. A pearl luster pigment comprising natural mica, synthetic mica, alumina flakes or silica flakes of which surface is covered with ferric oxide is also known, and this pearl luster pigment has metallic pearl luster of various color tones. According to the invention, among such pearl luster pigments, an interferential pearl luster pigment is used. This interferential pearl luster pigment is a pearl luster pigment such that it develops pearl luster accompanied by iris on account of covering layer formed of titanium dioxide or ferric oxide on the base material and having a predetermined range of thickness.

Such an interferential pearl luster pigment is commercially available, and such a commercial product can suitably be used in the invention. Specific examples of such a commercial product of an interferential pearl luster pigment comprising mica as a base material of which surface is covered with titanium dioxide include PEARLGLAZIE MB-100RF, MG-100RF, MRB-100RF, MY-100RF, MV-100RF, MV-100R and MB-100R, ARTIMICA BB-100, BE-100, GB-100, GD-100 and RBB-100, manufactured by Nihon Koken Kogyo Co., Ltd., and IRIODIN 201, 211, 221, 223, 7215, 7217, 7219, 215WNT and 221WNT, IRIODIN-ULTRA 7225WNT and 7235WNT, manufactured by Merck Japan Ltd.

An interferential pearl luster pigment comprising aluminum oxide of which surface is covered with titanium dioxide can also be used. Examples of such an interferential pearl luster pigment include XIRALLIC T60-10WNT, T60-20WNT, T60-21WNT, T60-23WNT and T60-24WNT, manufactured by Merck Japan Ltd.

It is preferred that the interferential pearl luster pigment used in the invention has a median diameter in a range of 5 to 150 μm. An interferential pearl luster having a median diameter less than 5 μm is insufficient in the characteristics such that the color tone varies with an angle for viewing due to too small pigment particles. On the other hand, the use of interferential pearl luster having a median diameter more than 150 μm does not provide a uniform coating film for the reason that the crayon obtained slips on a drawing surface when drawing is performed.

The crayon of the invention contains the interferential pearl luster pigment preferably in a range of 0.1 to 20% by weight. When the amount of an interferential pearl luster pigment used is less than 0.1% by weight based on the crayon, the crayon obtained is insufficient in the effect characteristic to the interferential pearl luster pigment such that the color tone varies with an angle for viewing. However, when the amount of an interferential pearl luster pigment is more than 20% by weight, a mixture comprising each component and a solvent prepared in manufacture of the crayon has a too high viscosity and decreased flowability so that it is difficult to mold the mixture into a crayon of a desired shape. The optimal amount of an interferential pearl luster pigment is in a range of 1 to 15% by weight based on the weight of the crayon.

The interferential pearl luster pigment as exemplified above may be used singly or together in a combination of two or more. The interferential pearl luster pigment can also be used in a mixture with an ordinary pearl luster pigment and a brightening pigment such as an aluminum pigment.

In the invention, a gelling agent is a component for integrally fixing each component into a solid. For example, dibenzylidene sorbitols, tribenzylidene sorbitols, an amino acid-based oil gelling agent and fatty acids are preferably used as the gelling agent. Examples of dibenzylidene sorbitols include dibenzylidene sorbitol and a compound (a dibenzylidene sorbitol derivative) in which a benzene nucleus in a benzylidene group of dibenzylidene sorbitol is substituted at any position with an alkyl group having 1 to 3 carbon atoms, and specific examples thereof include [di(p-methylbenzylidene)]sorbitol, [di(m-ethylbenzylidene)]sorbitol and [di(p-chlorbenzylidene)]sorbitol.

Examples of tribenzylidene sorbitols include tribenzylidene sorbitol and a compound (a tribenzylidene sorbitol derivative) in which a benzene nucleus in a benzylidene group of tribenzylidene sorbitol is substituted at any position with an alkyl group having 1 to 3 carbon atoms, and specific examples thereof include [tri(p-methylbenzylidene)]sorbitol, [tri(m-ethylbenzylidene)]sorbitol and [tri(p-chlorbenzylidene)]sorbitol.

Examples of amino acid-based oil gelling agents include N-acylglutaminediamide and di-n-butylamide N-lauroyl glutamate. Examples of fatty acid gelling agents include fatty acids and hydroxyfatty acids such as stearic acid, myristic acid and 12-hydroxystearic acid, and additionally metal salts of these fatty acids and hydroxyfatty acids, such as alkali metal salts and ammonium salts.

The amount of a gelling agent used in the crayon of the invention is suitably determined in accordance with the kind thereof, and it is usually in a range of 2 to 20% by weight, preferably in a range of 3 to 15% by weight. The use of too large amount of a gelling agent brings too high gel hardness to decrease colorability of the crayon obtained. On the other hand, the use of too small amount of a gelling agent makes it difficult to integrally gelate all the components together in manufacture thereof. The gelling agent as exemplified above may be used singly or together in two kinds or more.

The resin component used in the crayon of the invention performs the role of bringing all the components together in manufacture of the crayon as well as the role as a fixing agent of coating film formed on a drawing surface with the crayon obtained. According to the invention, a film-forming resin and an adherent resin are preferably used together as the resin component.

The film-forming resin is a resin for increasing the hardness of the crayon obtained and firming a coating film formed therewith on a drawing surface. The film-forming resin usable is not particularly limited if it has such properties, and includes, for example, cellulosic resins such as cellulose acetate butyrate, ethyl cellulose and acetyl cellulose, and vinyl resins such as polyvinyl butyral, polyvinyl acetate, vinyl acetate-vinyl chloride copolymer resin and vinyl acetate-ethylene copolymer resin are preferably used. These film-forming resins may be used singly or together in two kinds or more. Among the above-mentioned exemplifications, polyvinyl butyral resin having an acetyl group of 5% or less, a hydroxyl group of 18 to 40%, a butyral group of 60% or more and a polymerization degree of 200 to 2000 and cellulose acetate butyrate are particularly preferably used.

On the other hand, the adherent resin is a resin for increasing the adhesion properties of a coating film formed of the crayon of the invention to a drawing surface. The adherent resin usable also is not particularly limited if it has such properties. The adherent resin usable includes, for example, ketone resin, acrylic resin, xylene resin and polyamide resin. Examples of ketone resin include a condensate of cyclohexane and formaldehyde. Examples of acrylic resin include thermoplastic polyacrylic ester. Examples of xylene resin include a condensate of m-xylene and formaldehyde. Examples of polyamide resin include thermoplastic resin obtained by condensation polymerization of dimer acid and di- or polyamine, having a molecular weight of approximately 4000 to 9000. These adherent resins may also be used singly or together in two kinds or more.

In particular, according to the invention, it is preferred to use a combination of a film-forming resin of at least one selected from polyvinyl butyral and cellulose acetate butyrate and an adherent resin of at least one selected from acrylic resin, ketone resin and xylene resin.

The ratio of the film-forming resin to the adherent resin used is properly determined in relation with other components, and the weight ratio of the film-forming resin to the adherent resin is usually about 1:0.1 to 5, preferably about 1:0.2 to 3.

The content of the film-forming resin and the adherent resin in the crayon of the invention is usually in a range of 3 to 40% by weight in the total, preferably in a range of 6 to 35% by weight. Too high content of the resins brings too high gel hardness of the crayon obtained resulting in poor colorability and leveling properties, while too low content of resins makes it difficult to integrally gelate all the components together and does not allow sufficient fixity and strength to the crayon obtained.

The crayon of the invention contains as a resin component preferably such a resin that is polar and hence insoluble in a petroleum solvent as described above so that it can be used to repair a flaw caused in coating of a body of automobiles as described above. A wax for automobiles contains petroleum solvent. Consequently, when a crayon contains such a resin that is soluble in the petroleum solvent, a coating film provided on a flaw to be repaired by the crayon is occasionally dissolved when waxed by using such wax Therefore, according to the invention, because a polar resin as described above is preferably used as a resin component, glycols, glycol ethers, glycol ether esters and alcohols as described above are preferably used as a solvent for dissolving such a polar resin.

The crayon of the invention may contain a coloring agent together with the above-mentioned interferential pearl luster pigment. When such a coloring agent being contained, the crayon provides a metallic or pearly coating film in various colors on a drawing surface. It is important to use a coloring agent which does not react with an interferential pearl luster pigment and does not have an undesirable influence on color development of such an interferential pearl luster pigment. In addition, a coloring agent preferably has favorable solubility and dispersibility.

Specific examples of the coloring agent used include water-soluble dyestuffs such as acid dyes, direct dyes and basic dyes (triphenylmethane, xanthene, anthraquinone, metal complex and copper phthalocyanine), organic pigments or inorganic pigments such as phthalocyanine, quinacridone, carbon black and titanium dioxide, and additionally fluorescent pigment and precolored resin ball. Also, a coloring agent can be used as pigment dispersion. A coloring agent may be used singly or together in two kinds or more.

The coloring agent is preferably contained in a range of 0.01 to 30% by weight in a crayon. The use of coloring agent in an amount of less than 0.01% by weight baaed on the crayon brings little effect as a coloring agent. However, The use of a coloring agent in an amount of more than 30% by weight based on the crayon decreases the above-mentioned effect of using an interferential pearl luster pigment. The optimal amount of a coloring agent in the crayon varies with the kind thereof to a certain degree, but it is usually in a range of 0.05 to 20% by weight. When titanium dioxide is used as a coloring agent, however, titanium dioxide is a pigment with strong opacifying properties and thus used usually in a range of 10% by weight or less based on the crayon so that the above-mentioned effect of an interferential pearl luster pigment is not deteriorated.

The crayon of the invention may properly contain as required conventionally known additives, such as rust preventives, a filler, a leveling agent, a viscosity modifier, a structural viscosity producer and a drying agent, as other components in addition to the above-mentioned components, which crayon may properly contain also plasticizers such as diethyl phthalate, dibutyl phthalate, dioctyl phthalate, 2-ethylhexyl epoxyhexahydro phthalate, 2-ethylhexyl sebacate and tricresyl phosphate.

The gel hardness of the crayon can optionally be adjusted by kind and amount of a solvent, a gelling agent and resin used, and is properly determined in accordance with use thereof; in a range of typically about 5 to 50 kg/cm$^2$, preferably 7 to 30 kg/cm$^2$.

The crayon of the invention is not limited with regard to a manufacturing method thereof. The crayon can basically be obtained by uniformly mixing and integrally gelating each of the above-mentioned components; to take an example, first, in the case of needing a coloring agent, a film-forming resin is added and dissolved in a part of a solvent, and a coloring agent is added to the obtained solution and sufficiently dispersed by a mill or the like. Thereafter, the residual solvent and then an adherent resin, an interferential pearl luster pigment and a gelling agent are added to the resulting mixture and dissolved or dispersed therein. Finally, a mixture in uniform liquid form thus obtained is poured into a vessel having a desired shape and solidified by cooling to provide a crayon having such a shape. In the case of manufacturing a crayon in this manner, each of the components may be heated as required on the occasion of being dissolved.

The crayon of the invention can be drawn with favorable adhesive properties and smoothness on a drawing surface formed of any material, for example, metal such as an iron plate, ceramic, resin or glass. After drawing on such a drawing surface, the drawing is dried at room temperature (25° C.) for about 5 to 10 minutes to form a coating film superior in colorability on the drawing surface. In addition, a coating film thus formed on the drawing surface does not offer color migration and an interferential pearl luster pigment does not drop off the coating film. Furthermore, because the coating film contains an interferential pearl luster pigment, it has bright coloration, a great difference between the surface color and the bottom color, and luster having brightening properties and deep metallic or pearly iris. Herein the invention, the surface color signifies a color of a coating film on a drawing surface viewed in an approximately vertical direction to a drawing surface, while the bottom color signifies a color of a coating film on a drawing surface viewed in an approximately horizontal direction to a drawing surface, and when the difference between surface perceived color and bottom color is great, a coating film has iris by interference of light.

Accordingly, the crayon of the invention can appropriately be used not merely for ordinary drawing but also for repairing a flaw of metallic or pearly coating such as a body of automobiles, furniture and floors for the reason that when the crayon is applied to existing metallic or pearly coating, it is favorably adapted thereto for integration. Here, the metallic or pearly coating signifies coating containing a pearl luster pigment, including the above-mentioned interferential pearl luster pigment, and a metallic flake pigment, as pigment.

For example, during the run of automobiles, gravel or pebbles collide with the body to occasionally cause a small flaw in metallic or pearly coating of the body, or a scratch therein by something sharp. Depending on the case, such a flaw is occasionally as deep as reaches a metal plate, and in such a case, if the flaw is stood as it is, there is brought a possibility that a metal plate is corroded to make a hole. Then, according to the invention, the crayon as described above is applied into a flaw caused in metallic or pearly coating of the body, filled up to a surface of coating of the body, and then the excessive crayon on the flaw is wiped off with cloth. The body is then preferably polished with wax. The crayon is so favorably adapted to metallic or pearly coating of the body for integration therewith so that the flaw in coating of the body can be repaired.

The crayon of the invention is described further specifically by referring to examples together with comparative examples.

EXAMPLE 1

19 parts by weight of polyvinyl butyral resin (DENKA BUTYRAL 2000L, manufactured by Denki Kagaku Kogyo K.K.) and 13 parts by weight of acrylic resin (DIANAL BR-107, manufactured by Mitsubishi Rayon Co., Ltd.) were added and dissolved in 12 parts by weight of a mixture of ethylene glycol monobutyl ether, 20 parts by weight of propylene glycol monobutyl ether and 19.5 parts by weight of dipropylene glycol monomethyl ether. 1 part by weight of aluminum paste (STANDARD CROMAL X, manufactured by Ecarte Corporation) and 6 parts by weight of an interferential pearl luster pigment (PEARLGLAZE MRB-100RF, manufactured by Nihon Koken Kogyo Co., Ltd.) were added to the obtained solution and sufficiently dispersed.

Subsequently, 3.5 parts by weight of butyl benzyl phthalate was added thereto and dissolved by heating to a temperature of 130° C. while stirred, and subsequently 6 parts by weight of a sorbitol-based gelling agent (GELOL D, manufactured by New Japan Chemical Co., Ltd.) was added and dissolved. The obtained solution was poured into a vessel and solidified by cooling to thereafter take out a solid matter as a crayon.

EXAMPLE 2

12 parts by weight of cellulose acetate butyrate (CAB 381-1/2, manufactured by Eastman Chemical Company) was added and dissolved in 35 parts by weight of ethylene glycol monobutyl ether, 9.5 parts by weight of propylene glycol monobutyl ether and 5 parts by weight of butyl benzyl phthalate. 3 parts by weight of titanium dioxide was added to the obtained solution and sufficiently dispersed by a mill, and thereafter 16 parts by weight of ketone resin (HILAC 111, manufactured by Hitachi Chemical Company, Ltd.) was further added while stirred by heating at a temperature of 130° C., and then dissolved while maintained at the above-mentioned temperature.

Subsequently, 12 parts by weight of a pearl luster pigment (IRIODIN 100 SILVER, manufactured by Merck Japan Ltd.) and 1 part by weight of an interferential pearl luster pigment (IRIODIN 225, manufactured by Merck Japan Ltd.) were added and sufficiently dispersed, and thereafter 6.5 parts by weight of a sorbitol-based gelling agent (GELOL D) was added and dissolved. The obtained solution was poured into a vessel and solidified by cooling to take out a solid matter as a crayon.

EXAMPLE 3

14 parts by weight of polyvinyl butyral resin (S-LEC BM-S, manufactured by Sekisui Chemical Co., Ltd.) was added and dissolved in 40 parts by weight of ethylene glycol monobutyl ether and 9.8 parts by weight of 3-methyl-3-methoxybutanol. 0.5 part by weight of carbon black and 7 parts by weight of phthalocyanine blue were added to the obtained solution and sufficiently dispersed by a mill, and thereafter 15 parts by weight of ketone resin (HILAC 111, manufactured by Hitachi Chemical Company, Ltd.) was further added while stirred by heating at a temperature of 130° C., and then dissolved while maintained at the above-mentioned temperature.

Subsequently, 2 parts by weight of a pearl luster pigment (IRIODIN 100 SILVER, manufactured by Merck Japan Ltd.) and an interferential pearl luster pigment (PEARL-GLAZE MRB-100RF, manufactured by Nihon Kouken Kogyo Co., Ltd.) were added and sufficiently dispersed, and thereafter 4 parts by weight of a sorbitol-based gelling agent (GELOL D, manufactured by New Japan Chemical Co., Ltd.), 3 parts by weight of a sorbitol-based gelling agent (GELOL T, manufactured by New Japan Chemical Co., Ltd.) and 4 parts by weight of rust preventives (RUSMIN A, manufactured by Kyoeisha Chemical Co., Ltd.) were added, dissolved and dispersed. The obtained solution was poured into a vessel and solidified by cooling to take out a solid matter as a crayon.

EXAMPLE 4

18 parts by weight of polyvinyl butyral resin (S-LEC BL-1, manufactured by Sekisui Chemical Co., Ltd.) was added and dissolved in 10 parts by weight of ethylene glycol monobutyl ether, 20 parts by weight of propylene glycol monobutyl ether, 6 parts by weight of propylene glycol monomethyl ether acetate and 10 parts by weight of 3-methyl-3-methoxybutanol. 1.8 part by weight of carbon black and 6 parts by weight of phthalocyanine green were added to the obtained solution and sufficiently dispersed by a mill, and thereafter 5 parts by weight of xylene resin (NIKANOL HP-100, manufactured by Mitsubishi Gas Chemical Company, Inc.) and 10 parts by weight of ketone resin (HILAC 111, manufactured by Hitachi Chemical Company, Ltd.) were further added while stirred by heating at a temperature of 130° C., and then dissolved while maintained at the above-mentioned temperature.

Subsequently, 3 parts by weight of an interferential pearl luster pigment (IRIODIN 235, manufactured by Merck Japan Ltd.) and 6.2 parts by weight of a sorbitol-based gelling agent (GELOL D, manufactured by New Japan Chemical Co., Ltd.) were added, dissolved and dispersed. The obtained solution was poured into a vessel and solidified by cooling to take out a solid matter as a crayon.

COMPARATIVE EXAMPLE 1

In Example 1, an interferential pearl luster pigment PEARLGLAZE MRB-100RF was not used, and otherwise in the same manner as in Example 1, a crayon was obtained.

COMPARATIVE EXAMPLE 2

In Example 2, an interferential pearl luster pigment TRIODIN 225 was not used, and otherwise in the same manner as in Example 2, a crayon was obtained.

COMPARATIVE EXAMPLE 3

In Example 4, an interferential pearl luster pigment IRIODIN 235 was not used, and otherwise in the same manner as in Example 4, a crayon was obtained.

COMPARATIVE EXAMPLE 4

In Example 1, either of polyvinyl butyral resin and acrylic resin was not used, and otherwise in the same manner as in Example 1, a crayon was obtained.

The following tests were performed by using the crayons prepared as above. The results are shown in Table 1.

A Sense of Brightening

Drawing was performed on an iron plate with each of the crayons and dried to form a coating film thereon. The coating film was then visually observed while changing a visual angle for the drawing surface, and evaluate the difference between the surface color and the bottom color of the coating films. The case when a great difference was observed between the surface color and the bottom color and a strong sense of brightening was observed was evaluated as A, while the case when a small or no difference was observed between the surface color and the bottom color and a weak or no sense of brightening was observed was evaluated as B.

Fixity

Drawing was performed on an iron plate with each of the crayons and dried to form a coating film thereon. A commercial pressure-sensitive adhesive tape was stuck on the coating film, and then the tape was peeled off. Then, the state of the coating film was visually observed, and the fixity of the coating film was evaluated by the following standard. The case where an interferential pearl luster pigment was not peeled off the coating film and a sense of brightening before sticking the pressure-sensitive adhesive tape was not lost was regarded as A, while the case where an interferential pearl luster pigment was peeled off the coating film and a sense of brightening before sticking the pressure-sensitive adhesive tape was lost was regarded as B.

Drawing Properties

Drawing was performed on an iron plate with each of the crayons, and the case where the drawing was performed smoothly was regarded as A, while the case where the drawing was performed with a heavy sense was regarded as B.

TABLE 1

|  | Example | | | | Comparative Example | | | |
|---|---|---|---|---|---|---|---|---|
|  | 1 | 2 | 3 | 4 | 1 | 2 | 3 | 4 |
| Brightening Properties | A | A | A | A | B | B | B | A |
| Fixity | A | A | A | A | A | A | A | B |
| Drawing Properties | A | A | A | A | A | A | A | B |

Through the results shown in Table 1, the coating films formed by using the crayons of Examples 1 to 4 have a great difference between the surface color and the bottom color, strong brightening properties and iris, and additionally superior fixity and drawing properties. The crayons according to Examples 1 to 4 contain an interferential pearl luster pigment and provides coating films having a great difference between the surface color and the bottom color, and metallic or pearly iris with a strong sense of brightening. Therefore, the application of the crayons into a flaw of a body of automobiles and furniture forms coating films integrated with metallic or pearly coating of a body of automobiles and furniture.

On the contrary, the crayon according to Comparative Example 1 does not contain an interferential pearl luster pigment, and the coating film is metallic on account of the aluminum powder used therein, but it offers a weak sense of brightening, as compared with the crayon of Example 1, The crayon of Comparative Example 2 does not contain an interferential pearl luster pigment, and the coating film is pearly on account of the pearl luster pigment used therein, but it offers no sense of brightening, as compared with the crayon of Example 2.

The crayon of Comparative Example 3, as compared with the crayon of Example 4, does not contain an interferential pearl luster pigment, and the coating film offers no brightening properties. The crayon of Comparative Example 4, as compared with the crayon of Example 1, does not contain any resin component and thereby is soft and poor in drawing properties by reason of getting out of shape in drawing, and the coating film offers poor leveling and fixity.

The invention claimed is:

1. A crayon comprising an organic solvent, a resin soluble in the organic solvent, a coloring agent, a gelling agents a pearl luster pigment and an interferential pearl luster pigment.

2. A crayon according to claim 1 wherein the organic solvent is at least one selected from the group consisting of glycols, glycol ethers, glycol ether esters and alcohols.

3. A crayon according to claim 1 wherein the gelling agent is at least one selected from the group consisting of dibenzylidene sorbitol, tribenzylidene sorbitol and a derivative thereof.

4. A crayon according to claim 1, wherein
   the resin comprises a combination of a film-forming resin and an adherent resin;
   the film-forming resin is at least one selected from the group consisting of polyvinyl butyral and cellulose acetate butyrate; and
   the adherent resin is at least one selected from the group consisting of acrylic resin, ketone resin and xylene resin.

5. A crayon according to claim 1 comprising titanium dioxide in a range of 10% by weight or less.

6. A crayon according to claim 1 wherein the organic solvent is at least one selected from the group consisting of ethylene glycol monobutyl ether, propylene glycol monopropyl ether, propylene glycol monobutyl ether, dipropylene glycol monomethyl ether and 3-methyl-3-methoxybutanol.

7. A method of repairing a flaw caused in pearly or metallic coating, wherein a crayon according to claim 1 is applied into said flaw and filled up to a surface of said coating.

* * * * *